United States Patent [19]
Choi

[11] Patent Number: 6,079,723
[45] Date of Patent: Jun. 27, 2000

[54] REAR WHEEL SUSPENSION SYSTEM OF VEHICLE

[75] Inventor: Nam-Hyun Choi, Kyungki-do, Rep. of Korea

[73] Assignee: Hyundai Motor Company, Seoul, Rep. of Korea

[21] Appl. No.: 09/219,124

[22] Filed: Dec. 23, 1998

[30] Foreign Application Priority Data

Dec. 30, 1997 [KR] Rep. of Korea ........................ 97-79408

[51] Int. Cl.[7] .................................................. B60G 7/00
[52] U.S. Cl. ............................ 280/124.17; 280/124.175; 280/124.176
[58] Field of Search ..................... 280/124.176, 124.175, 280/124.117, FOR 175, 5.523, 5.524; 267/260, 263, 269, 270, 239, 240, 271

[56] References Cited

U.S. PATENT DOCUMENTS

| | | | |
|---|---|---|---|
| 1,179,130 | 4/1916 | Mercier | 267/263 |
| 2,215,826 | 9/1940 | Crane | 280/124 |
| 2,308,967 | 1/1943 | Kuss | 403/224 |
| 3,920,264 | 11/1975 | Lafferty | 280/124 |
| 4,919,449 | 4/1990 | Toms | 280/688 |
| 5,354,092 | 10/1994 | Calvert | 280/718 |
| 5,676,356 | 10/1997 | Ekonen et al. | 267/294 |

*Primary Examiner*—Lanna Mai
*Assistant Examiner*—Kevin McKinley

[57] ABSTRACT

A rear wheel suspension system of a vehicle where front and rear ends of leaf spring are disposed at left and right side frames of a body via front and rear mounting parts to a centrally fixed rear axle, wherein the front mounting part on the leaf spring comprises: a mounting block for pivoting a front end of the leaf spring; a compliant bush wherein one side surface of the compliant bush is connected to the mounting block; and a bracket connected to the other side surface of the compliant bush to be fixed to a side frame. The rear end of the mounting block is pivoted to the side frame via a control link that is a slightly slanted downward against the side frame and is arranged with an inward inclination, a rear end of the mounting block being pivoted to the side frame via a control link that is a slanted downwardly against the side frame and is arranged with an inward inclination defining a relative orientation that imparts an understeering bias to the rear wheel suspension system that offsets the oversteering bias inherent in the suspension system when subjected to various external forces.

3 Claims, 9 Drawing Sheets

REAR WHEEL SUSPENSION SYSTEM OF VEHICLE

BACKGROUND OF THE INVENTION

1. Field of the Invention

The present invention relates to a rear wheel suspension system of a vehicle, and more particularly to a rear wheel suspension system of a vehicle wherein a mounted part at a front side of suspension system at the rear wheels is configured to respond to lateral forces applied to the rear axle during turning of the vehicle to provide a turn characteristic with an under steering, bias to, thereby ensure the stable turning of the vehicle.

2. Description of Prior Art

Generally, a chassis spring in a suspension system of a vehicle is a mechanical element mounted between wheels to absorb shocks transmitted from the roadbed and vibrations of tires of a vehicle to minimize shocks and vibrations transmitted to the vehicle, thereby improving the ride feeling. The chassis spring is generally a leaf spring, a coil spring and an air spring, or the leaf spring is usually adopted due to heavy-duty trucks for its reasonable price, easy maintenance and good durability.

Figure 1:
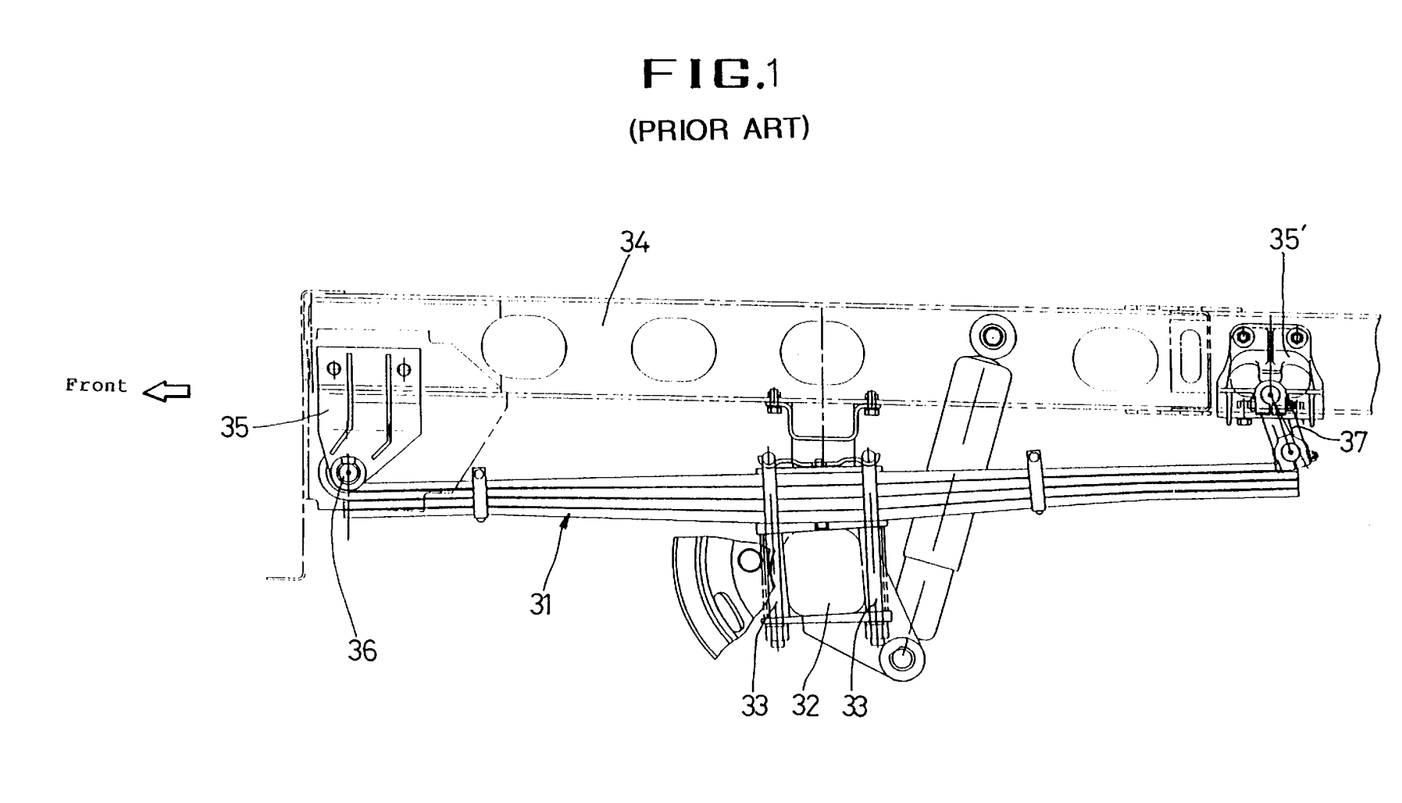
FIG. 1 is a side view for illustrating a conventional leaf spring mounting arrangement on a rear suspension system of a conventional vehicle.

FIG. 1 is a side view for illustrating a mounted state of a leaf spring to rear wheels of a vehicle according to the prior art, wherein, the leaf spring 31 is centrally fixed to a rear axle 32 via U-bolt 33 and is directly coupled to a first mounting bracket 35 fixed to a side frame 34 of a body via a bolt 36, while the leaf spring 31 is coupled at a rear end thereof to a shackle 37, and the other end of the shackle 37 is fixed to a second mounting bracket 35' coupled to the side frame 34 via the bolt 36.

Figure 2:
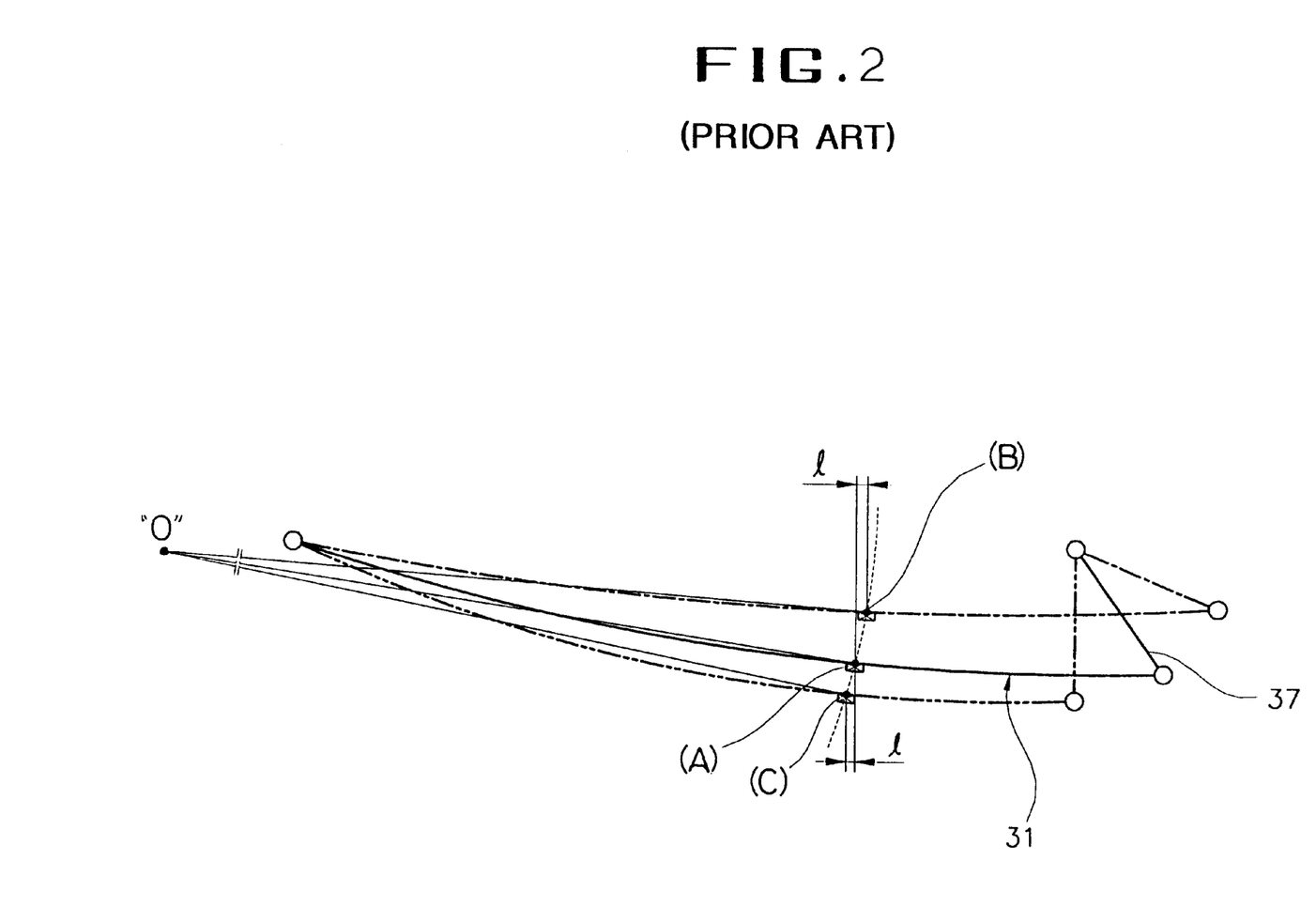
FIG. 2 is a schematic side view for illustrating a moving trace of an axle fixed to a leaf spring of FIG. 1 when a conventional vehicle turns around.

The leaf spring 31 mounted on the side frame 34 repeats vertical elongation and restoration according to shocks transmitted from the roadbed and loads applied to the body while a vehicle is running due to its materialistic kinematics property; and the rear axle 32 fixed to an approximate central part of the leaf spring 31 via the U bolt 33 vertically moves along a circular arc showing a predetermined shape of a trace around a rotating central point (0) existing at a front predetermined position of the body. A point (A), which is a coupling position of the leaf spring 31 for fixing the rear axle 32, maintains a normal position during a normal running state of a vehicle but moves to a point (B) or a point (C) according to load change of the body, or shock change from the roadbed, as illustrated in FIG. 2.

In other words, the point (A) which is a fixing point of rear axle 32 on the leaf spring 31 moves to the point (B) when the body bumps, while the point (A) moves to the point (C) when the body rebounds. As mentioned above, when the point (A) which is the fixing point of rear axle 32 on the leaf spring 31 vertically moves from the point (B) to the point (C) along the trace on the circular arc around the rotating central point (0), the point (A) moves back and forth up to maximum interval of "l" as is seen in FIG. 2.

Accordingly, there is a disadvantage in that wheels at the rear axle 32 are changed in running directions thereof when a vehicle rolls, thereby resulting in an axle steer phenomenon.

Figure 3:
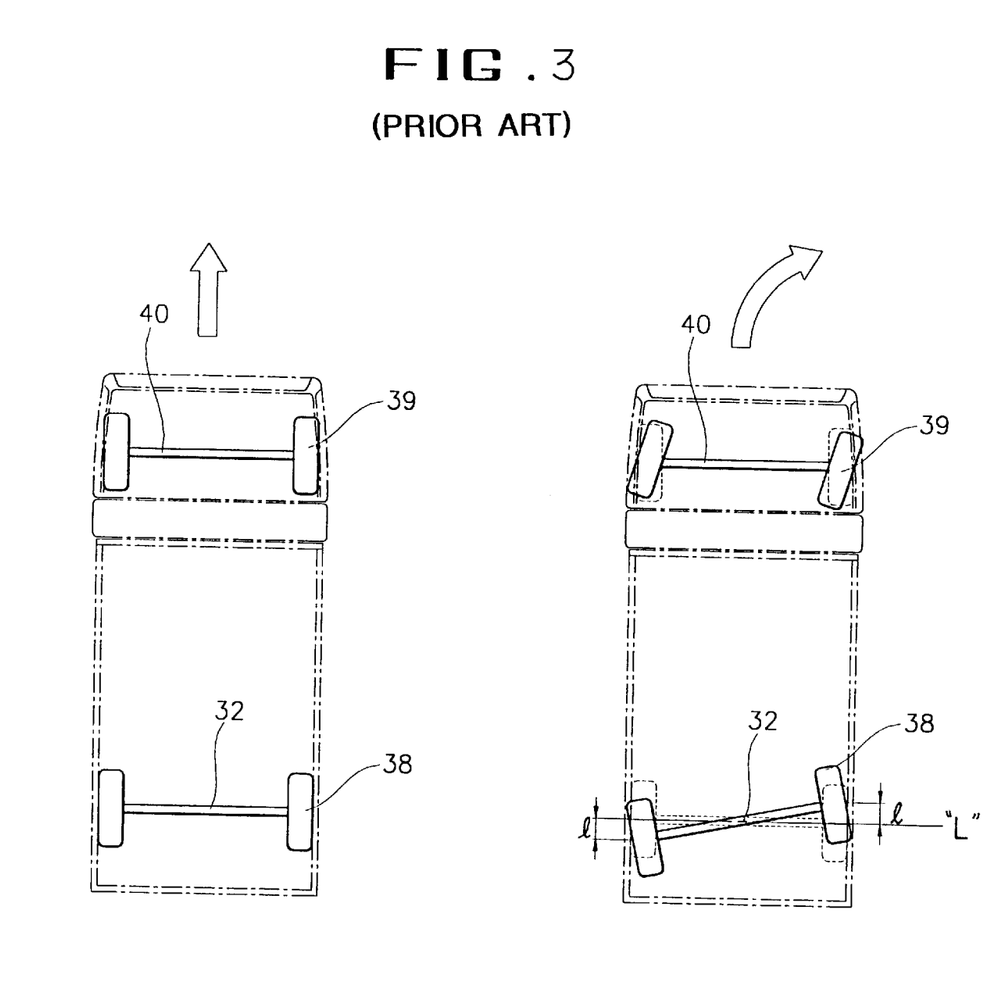
FIG. 3 is a schematic plan for illustrating a rear wheel suspension system when a conventional vehicle with the leaf spring mounted as in FIG. 1 runs straight and turns right.

Meanwhile, the axle steer phenomenon which occurs according to changes of load applied to the leaf spring 31 of a running vehicle can be severely generated when the vehicle turns around, and FIG. 3 illustrates a suspension system of rear wheels when a vehicle runs straight and turns around.

In other words, as illustrated in FIG. 3, the rear axle 32 supporting rear wheels maintains in parallel with a front axle 40 supporting front wheels when a vehicle runs straight. However the running vehicle turns to the right, a centrifugal force is applied to an opposite direction of a body of the vehicle, such that, load of the body is applied to the leaf spring 31 supporting the rear axle 32 from the opposite direction of turn due to the centrifugal force. The leaf spring 31 positioned in the opposite direction of turn moves from the point (A) which is the fixing point of the rear axle 32 to the point (B), as it is deformed while the body bumps.

At the same time, the leaf spring 31 positioned in the turning direction moves from the point (A) which is the fixing point of the rear axle to the point (C), as it is deformed while the body rebounds.

Successively, one end of rear axle 32 in the opposite direction of turn is pushed backward to a maximum of "l" from an extension line (L) of a normal rear axle 32, while one end of rear axle 32 in the turn direction is pushed forward to a maximum of "l" from the extension line (L) of the normal rear axle 32.

In other words, there is a disadvantage in that, when a vehicle turns, the stance of the vehicle body is slanted to an opposite direction of the turn due to centrifugal force applied to the body, thereby resulting in an axle steer phenomenon where the rear axle 32 and wheels 38 mounted thereto are facing in the opposite direction of turn due to kinematics property of the leaf spring 31.

As mentioned above, when rear axle 32 is changed in direction thereof while a vehicle turns, a so-called over steer phenomenon occurs where an actual turning radius becomes smaller than a steer degree made by steer manipulation of a driver, in addition to the axle steer phenomenon, thereby decreasing the stability of turns.

Furthermore, when the direction of the rear axle 32 is changed to allow rear wheels mounted thereto to face in the opposite direction, wheel alignment of the rear wheel 38 mounted on the rear axle 32 is changed to toe-out, by which friction between tires of the rear wheels 38 and the roadbed is deepened to thereby increase the wear of the tires.

SUMMARY OF THE INVENTION

Accordingly, it is an object of the present invention to provide a rear wheel suspension system of a vehicle constructed and arranged to a bias to create a mounted part of a suspension system responsive to lateral forces applied to the rear wheels while a vehicle is running and to cause steering characteristics to be biased toward under steering for ensuring stable turns.

In accordance with the object of the present invention, there is provided a rear wheel suspension system of a vehicle where front and rear ends of leaf springs disposed at left and right side frames of a body via front and rear mounting parts to a centrally fixed rear axle, wherein the front mounting part on the leaf spring comprises:

a mounting block for pivoting a front end of the leaf spring;

a compliant bush wherein one side surface of the compliant bush is connected to the mounting block; and a bracket connected to the other side surface of the compliant bush to be fixed to a side frame;

the rear end of mounting block being pivoted to the side frame via a control link that is slanted downwardly against the side frame and is arranged with an inward inclination defining a relative orientation that imparts an understeering bias to the rear wheel suspension system that offsets the oversteering bias inherent in the suspension system when subjected to various external forces.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

The preferred embodiment of the present invention will now be described in detail with reference to the accompanying drawings.

Figure 4:
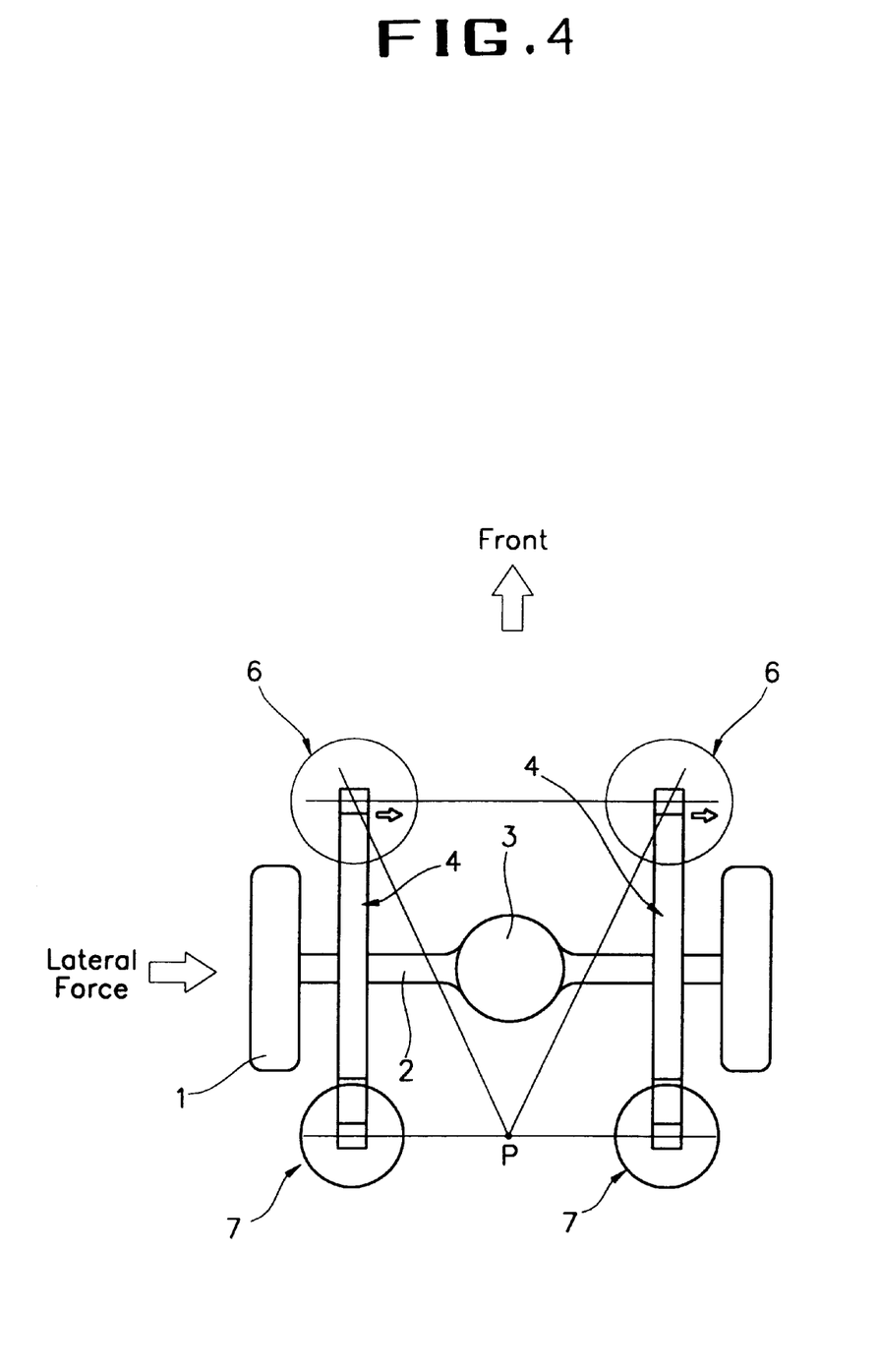
FIG. 4 is a schematic plan for illustrating a rear wheel suspension system of a vehicle according to the present invention.

FIG. 4 illustrates a rear wheel suspension system of a vehicle, where, left and right rear wheels 1 are mounted to both ends of rear axle 2, which in turn is divided into two portions to the left and right sides around a central differential gear 3. The differential gear 3 receives drive power from an engine via a driving shaft (not shown) to drive the rear axle 2.

The rear axle 2 is fixed at both sides thereof. A central portion of the left and right leaf springs 4 are respectively mounted on a side frame 5 of a vehicle body.

Particularly, a front mounting part 6 of the leaf spring 4 against the side frame 5 is so arranged as to rotate around a rotary central point (P) that meets a central rear axle 2 on a line that connects respective rear mounting parts 7 of the leaf spring 4.

Figure 5:
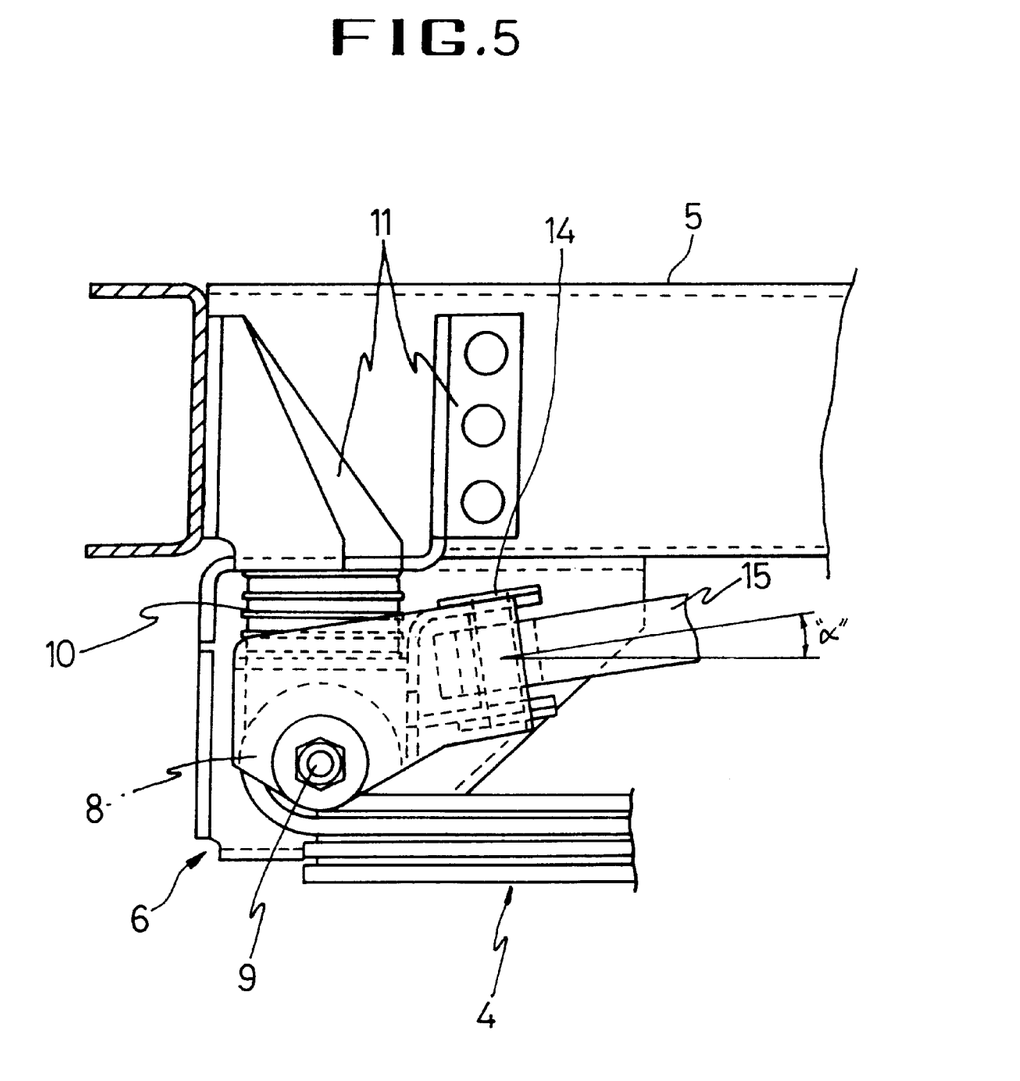
FIG. 5 is a side view for illustrating a front mounting part of the rear wheel suspension system in FIG. 4.
Figure 6:
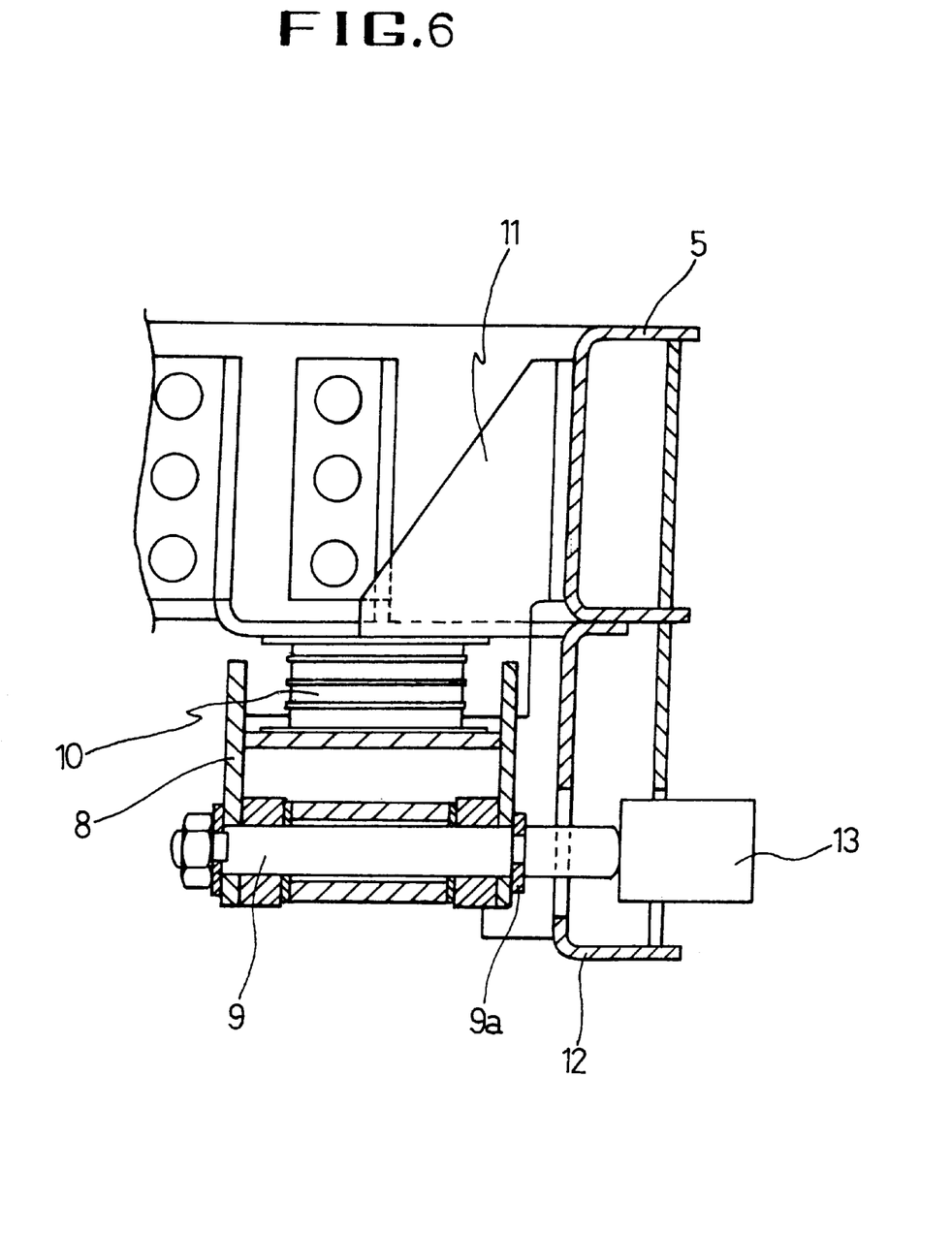
FIG. 6 is a rear view of the front mounting part in FIG. 5.

When a lateral force is applied to the rear wheels while a vehicle turns, the front mounting part 6 of the leaf spring 4 is so constructed as to rotate around the rotary central point (P) within a small limited scope toward a direction where the lateral is applied, such that the front mounting part of the leaf spring 4 is fixed to a mounting block 8 by a coupling pin 9 where the front end of the leaf spring 4 horizontally pierces the mounting block 8, and the mounting block 8 is in turn coupled to a bottom surface of a compliant bush 10 as illustrated in FIGS. 5 and 6. Furthermore, the compliant bush 10 is connected at an upper surface thereof to a bottom part of the bracket 11 and the bracket 11 is respectively secured at one surface thereof to the side frame 5 and an auxiliary side frame 12 at right angle.

Figure 7:
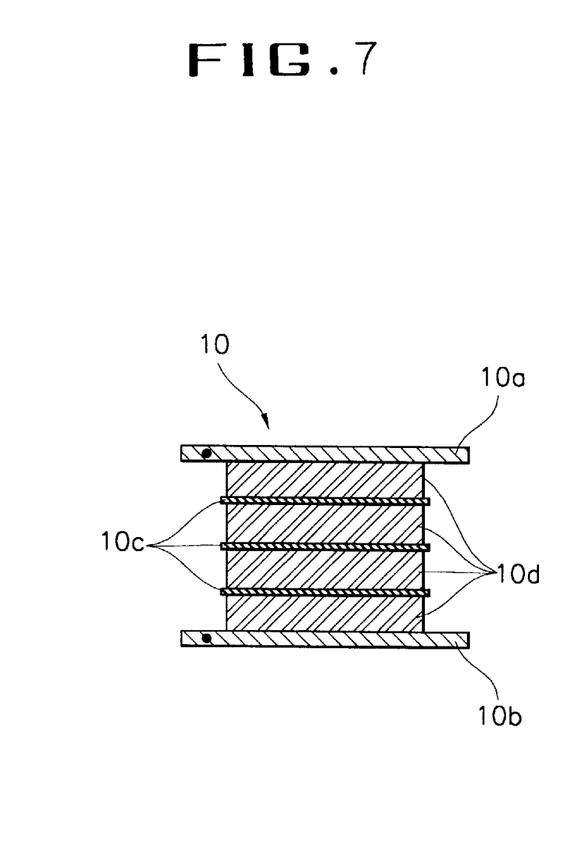
FIG. 7 is a sectional view of compliant bushes, respectively, illustrated in FIGS. 5 and 6.

At this location, the compliant bush 10 is disposed as illustrated in FIG. 7, with upper/lower plates 10a and 10b respectively coupled to the bracket 11 and the mounting block 8 and a rear cushioning material 10d integrally formed and vulcanized in between the upper/lower plates 10a and 10b and a plurality of diaphragms 10c. The compliant bush 10 can resist deformation by way of the diaphragms 10c against vertical load while it can deform toward lateral direction against lateral load.

Meanwhile, the coupling pin 9 for fixing the front end of the leaf spring 4 to the mounting block 8 pierces at one end thereof the auxiliary side frame 5, where the pin 9 is fixed by a snap ring 9a on the mounting block 8, and extends to a biasing mechanism 13 disposed on the auxiliary side frame 12 to thereafter contact the biasing mechanism 13.

Figure 8:
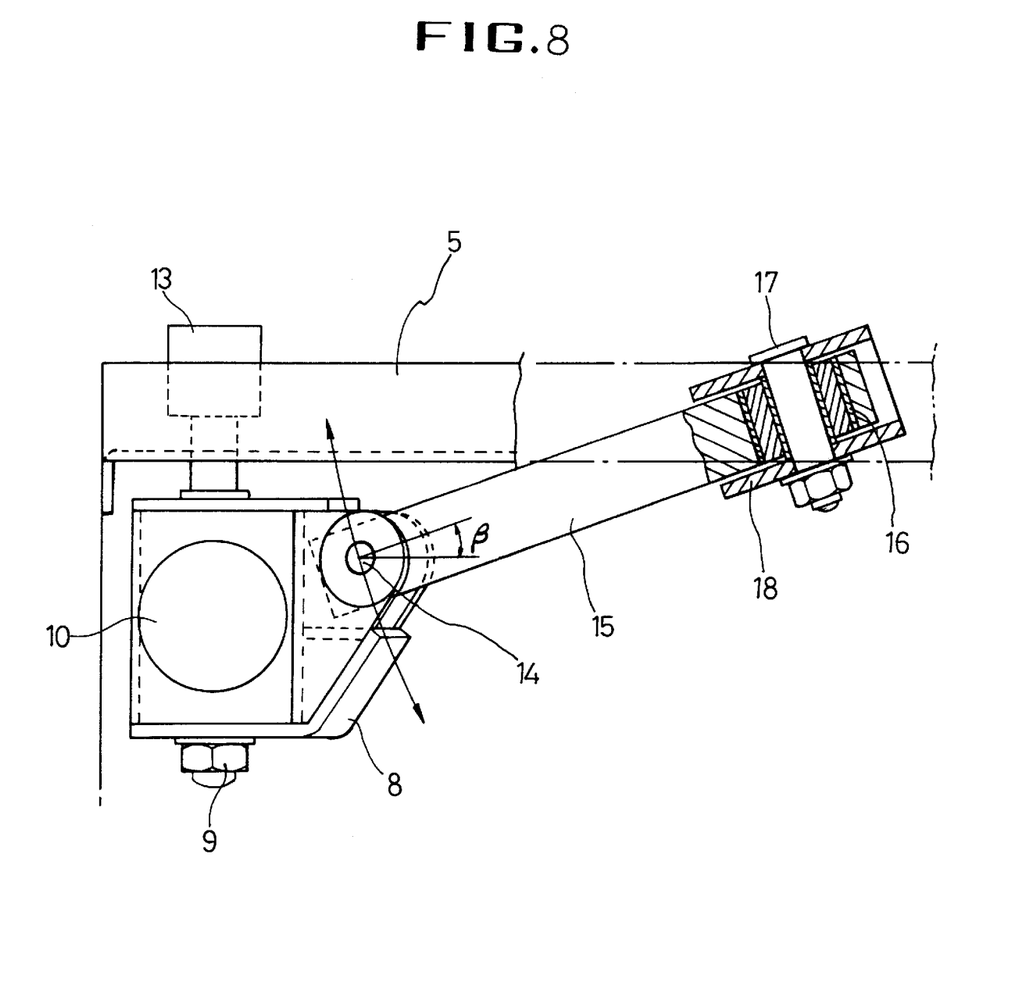
FIG. 8 is a bottom view of the rear wheel suspension system illustrated in FIG. 5.

The mounting block 8 is pivoted at one rear end thereof to one end of a control link 15 via a coupling bolt 14 that vertically pierces the mounting block 8, as illustrated in FIGS. 5 and 8, and the control link 15 is pivoted at the other end thereof to a bracket 18 connected to a bottom surface of the side frame 5 via a coupling bolt 17 that horizontally pierces a bush 16, where the bush 16 is a rubber cushioning material.

The control link 15 is inclined downward at approximately "α" degree against the side frame 5 and is also inclined inwardly of the side frame 5 at approximately "β" degrees. The reason the control link 15 is inclined downward at approximately "α" degrees against the side frame 5 is to compensate for compression which occurs on the compliant bush 10 due to loads of a running vehicle, and the reason the control link 15 is inclined inwardly of the side frame 5 at approximately "β" degree is to compensate for deformation of wheel alignment at the rear wheels 1 when the control link 15 pivoted to the side frame 5 is rotated at a rear end thereof due to lateral forces applied to the rear wheels 1.

When the control link 15 arranged between the mounting block 8 and the side frame 5 supports the front mounting part 6 of the leaf spring 4, effect of the compliance at the compliant bush 10 is increased when a vehicle turns.

Furthermore, the control link 15 is pivoted to the bracket 18 coupled to the side frame 5 via the bush 16, such that the front mounting part 6 of the leaf spring 4 can be rotated at a predetermined angle (approximately plus/minus 1 degree) around a pivotal point against left and right directions of the body.

In other words, although the compliant bush 10 generates a deformation for laterally moving the front mounting part 6 according to the lateral force applied to the rear wheels 1 when a vehicle turns, and because the control link 15 is pivoted at a rear end thereof by the coupling bolt 17 horizontally coupled to the bracket 18, the control link 15 is allowed to rotate as much as shrinkage of the bush 16 when the vehicle is moved to the left and right, as illustrated in FIG. 8.

Figure 10:
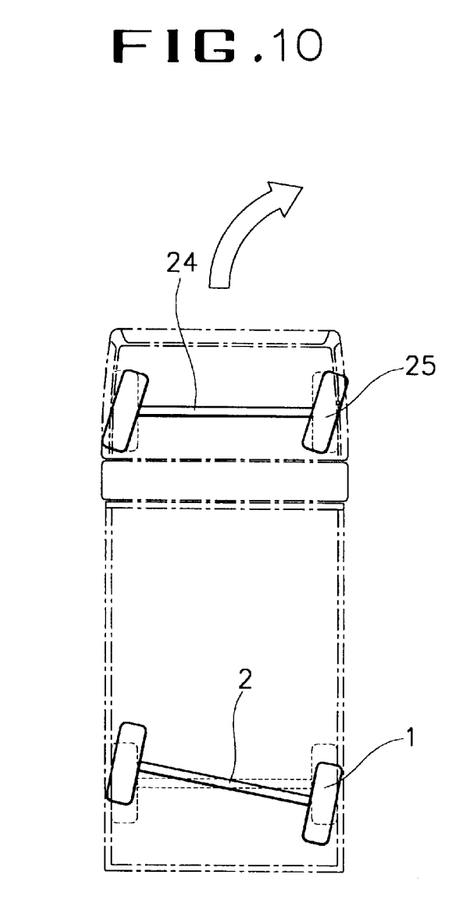
FIG. 10 is a schematic plan for illustrating a rear axle of a vehicle equipped with the rear wheel suspension system according to the present invention with wheels the vehicle turns to the right.

Subsequently, when the rear wheels 1 are applied by lateral force when the vehicle turns around, the front mounting part 6 of the leaf spring 4 can be rotated toward the direction the lateral force is applied around the rotary central point (P) via the compliant bush 10, and the rear axle 2 fixed to the leaf spring 4 and situated a little while the rear axle 2 situated at outside of the rotating direction is rotated forward, as illustrated in FIG. 10.

When the rear wheels 1 and rear axle 2 mounted therewith are direction toward the rotating direction, the wheel alignment of the rear wheels 1 toe-in, and steering characteristics are biased toward under-steering to thereby promote stability of the steering.

Figure 9:
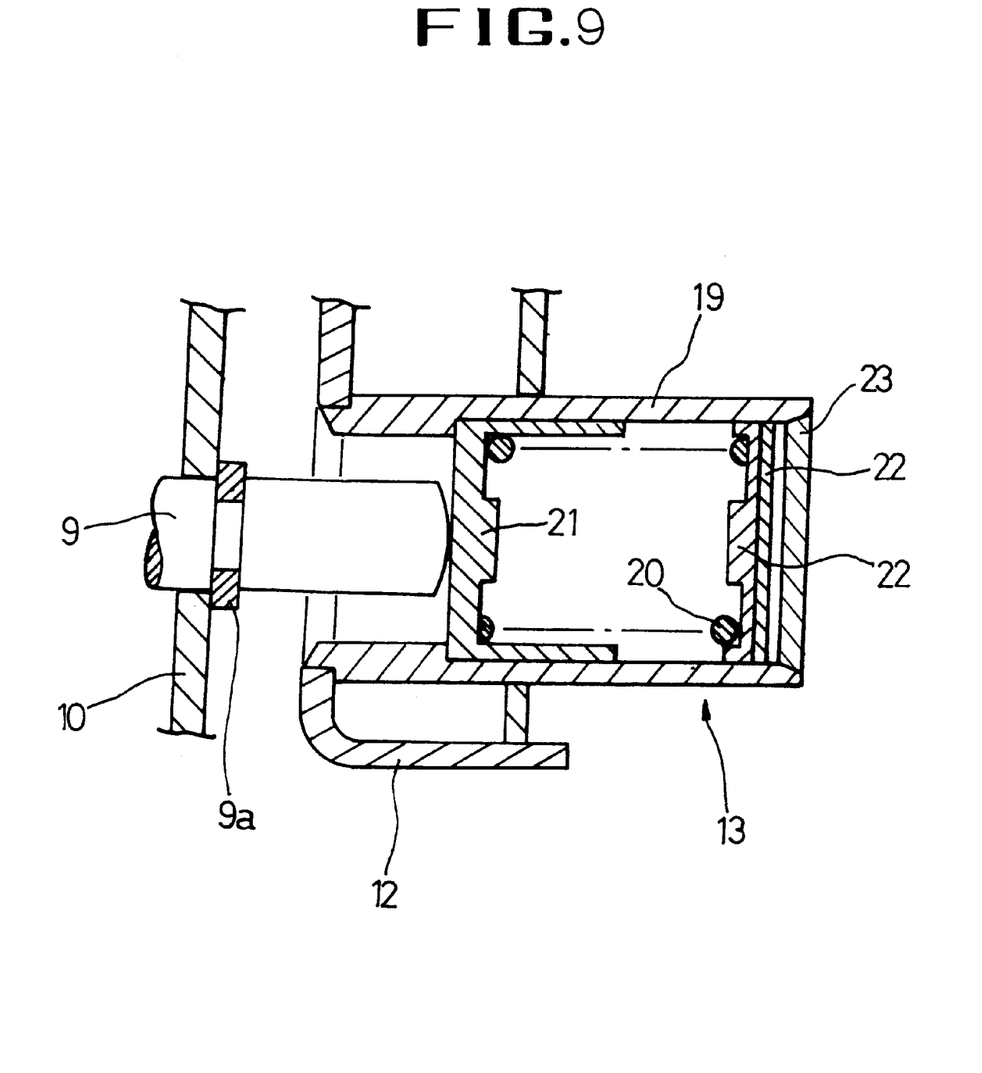
FIG. 9 is an enlarged sectional view of principal parts illustrated in FIG. 6.

Meanwhile, the biasing mechanism 13 includes, as illustrated in FIG. 9, a hollow housing 19 fixed to the auxiliary side frame 12, a piston 21 elastically supported in the housing via a spring 20, and a finishing material 23 secured to the other end of the housing 19 to restrain the spring by accommodating a plate 22 that connects one end of the spring to support a bottom surface of the piston 21. The piston 21 contacts one end of the coupling pin 9 for fixing the leaf spring 4 that pierces the mounting block 8 to thereby support the coupling pin 9 elastically.

When one rear wheel 1 is deflected in alignment thereof to thereby result in wandering phenomenon that causes a changed alignment of one rear wheel 1 due to lateral force applied only to one rear wheel 1, and influence of slopes at the roadbed while the vehicle runs straight, the piston 21 at the biasing mechanism 13 elastically supports one end of the coupling pin 9, such that the biasing mechanism 13 can effectively resist the rotation of the mounting block 8 even if the compliant bush 10 is deformed by the lateral force applied from the rear wheels 1 and the mounting block 8 is rotated, thereby ruling out the wandering phenomenon effectively, which is however only possible when the lateral force applied to the rear wheels 1 cannot cope with elasticity of the spring 20.

Furthermore, in case a strong lateral force that resists the elasticity of the spring 20 at the biasing mechanism 13 is simultaneously applied to both rear wheels 1 when the vehicle turns around, the compliant bush 10 disposed at the front mounting part 6 of both leaf springs 4 are deformed toward the rotating direction, and respective control links 15 rotatably pivoted to the front mounting part 6 can guide a smooth rotation of the front mounting part 6 when the front mounting part 6 of both leaf springs 4 are rotated by the deformation of the compliant bush 10. Likewise, when the lateral force applied to the rear wheels 1 are removed after the vehicle completes the turn, an elasticity is applied to the coupling pin 9 to provide a restoring function to the front mounting part 6 of the leaf spring 4, thereby making the wheel alignment of the rear wheels 1 return to a pre-rotation state.

Here, the plate 22 serves to change pre-load of the spring 20 elastically supporting the piston 21, thereby applying pressure to the coupling pin 9. When thickness of the plate 22 and the number of plates in the housing 19 are adjusted, the pre-load applied to the spring 20 can be freely controlled and a marginal point on which the wandering phenomenon occurs responsive to the lateral force applied to the rear wheels 1 during straight running of a vehicle, can be arbitrarily controlled.

Therefore, the mounting block 8 moves trailing a trace of a predetermined shape toward the rotation direction around the rotary central point (P) when the compliant bush 10 mounted between the mounting block 8 which is the front mounting part 6 of the leaf spring 4 and the bracket 11 is rotated to thereafter be deformed by the lateral forced applied to the rear wheels 1. At this time, the rotary movement of the front mounting part 6 of the leaf spring 4 can be effectively controlled by the control link 15 because the control link 15 tightly pivots the front mounting part 6 on the auxiliary side frame 12.

It should be noted that in the structural description of the front mounting part 6 of the leaf spring 4, the front mounting parts 6 are mounted in the identical form on the left and right leaf spring 4, and the front mounting parts 6 of the left and right leaf spring 4 are deformed toward rotating direction, where the lateral force is applied, by the lateral force applied to the rear axle 2 through the rear wheels when the vehicle turns around.

As apparent from the foregoing, there is an advantage in the rear wheel suspension system of a vehicle according to the present invention, in that the front mounting parts 6 of the leaf spring 4 are supported by the compliant bush 10 arranged between the mounting block 8 and the bracket 11 mounted on the side frame 5 and by the control link 15 mounted between one end of the mounting block 8 and the side frame 5, such that the compliant bush 10 connecting the mounting block 8 to the side frame 5 when a vehicle turns around brings in compliance according to the lateral force and the rear wheels 1 are steered toward the same rotation direction as front wheels 25 mounted on front axle 24, thereby making the rear wheels 80 biased toward under steering and improving stability of turn of the vehicle.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A rear wheel suspension system for a vehicle having front and rear ends of leaf springs disposed at left and right side frames of a body via front and rear mounting parts to a centrally fixed rear axle, wherein the front mounting part on the leaf spring comprises:

a mounting block for pivoting a front end of the leaf spring;

a compliant bush wherein one side surface of the compliant bush is connected to the mounting block; and a bracket connected to the other side surface of the compliant bush to be fixed to a side frame;

a rear end of the mounting block being pivoted to the side frame via a control link that is slanted downwardly against the side frame and is arranged with an inward inclination defining a relative orientation that imparts an understeering bias to the rear wheel suspension system that offsets the oversteering bias inherent in the suspension system when subjected to various external forces.

2. The rear wheel suspension system as defined in claim 1, wherein the compliant bush comprises:

upper/lower plates respectively coupled to a bracket and the mounting block; and a rubber cushioning material integrally formed and vulcanized in between the upper/lower plates and a plurality of spaced major diaphragms, surfaces of the diaphragms being substantially parallel to major surfaces of the plates and disposed in between the plates.

3. The rear wheel suspension system as defined in claim 1, wherein the front mounting part of the leaf spring is resiliently supported by a piston to which pressure is applied via a spring whose elasticity can be arbitrarily adjusted in a hollow housing fixed to a body of a vehicle.

* * * * *